US005776849A

United States Patent [19]
Fung et al.

[11] Patent Number: 5,776,849
[45] Date of Patent: *Jul. 7, 1998

[54] REGENERATION OF SEVERELY DEACTIVATED REFORMING CATALYSTS

[75] Inventors: Shun Chong Fung, Bridgewater, N.J.; Yao-Jyh Robert Huang; John Francis Walsh, both of Houston, Tex.; Gary Brice McVicker, Califon, N.J.; Kenneth Ray Clem, Humble, Tex.

[73] Assignee: Exxon Research & Engineering Company, Florham Park, N.J.

[ * ] Notice: The term of this patent shall not extend beyond the expiration date of Pat. No. 5,925,819.

[21] Appl. No.: 942,694

[22] Filed: Sep. 9, 1992

Related U.S. Application Data

[63] Continuation-in-part of Ser. No. 709,154, Jun. 3, 1991, abandoned, which is a continuation of Ser. No. 432,221, Nov. 6, 1989, abandoned, which is a continuation of Ser. No. 205,567, Jun. 15, 1988, Pat. No. 4,925,819, which is a continuation of Ser. No. 814,027, Dec. 23, 1985, abandoned, which is a continuation of Ser. No. 550,951, Nov. 10, 1983, abandoned.

[51] Int. Cl.$^6$ .............................. B01J 29/38; B01J 38/44; B01J 38/42; C10G 35/095
[52] U.S. Cl. ........................... 502/37; 502/35; 208/140
[58] Field of Search ..................... 502/37, 35; 208/140

[56] References Cited

U.S. PATENT DOCUMENTS

| | | | |
|---|---|---|---|
| 3,986,982 | 10/1976 | Crowson et al. | 502/37 |
| 4,192,771 | 3/1980 | Burbidge et al. | 502/37 |
| 4,218,338 | 8/1980 | Huin et al. | 502/37 |
| 4,855,269 | 8/1989 | Mohr | 502/37 |
| 4,914,068 | 4/1990 | Cross et al. | 502/37 |
| 4,925,819 | 5/1990 | Fung | 502/37 |
| 5,106,798 | 4/1992 | Fung | 502/37 |
| 5,256,612 | 10/1993 | Fung | 502/37 |

*Primary Examiner*—Ponnathapura Achutamurthy
*Attorney, Agent, or Firm*—Edward F. Sherer

[57] ABSTRACT

The invention is directed a process for regenerating deactivated reforming catalysts comprising at least one Group VIII metal on zeolite L, preferably wherein the catalysts are extruded using a binder material such as alumina or silica. The process includes: a) coke burn at severe conditions to improve the accessibility of the Group VIII catalytic metal particles by transporting them to the outside of the zeolite microchannels; b) catalytic metal redispersion by wet oxychlorination with elemental chlorine and oxygen; c) stripping with a gas stream comprising oxygen and water at low pressure to remove as much residual chlorine as possible; and d) reduction of catalytic metals with hydrogen at low pressure. The process is particularly effective for recovering activity of catalysts which have been severely deactivated.

21 Claims, No Drawings

5,776,849

1

REGENERATION OF SEVERELY DEACTIVATED REFORMING CATALYSTS

CROSS-REFERENCE TO RELATED APPLICATION

This application is a Continuation-In-Part of U.S. Ser. No. 07/709,154 filed Jun. 3, 1991, abandoned, which is a Continuation of U.S. Ser. No. 07/432,221, filed Nov. 6, 1989, now abandoned; which is a Continuation of U.S. Ser. No. 07/205,567, filed Jun. 15, 1988, which issued as U.S. Pat. No 4,925,819; which is a Continuation of U.S. Ser. No. 814,027, filed December 23, 1985, now abandoned; which is a Continuation U.S. Ser. No. 550,951, filed Nov. 10, 1983, now abandoned, all disclosures of which are incorporated in their entireties by reference thereto herein.

BACKGROUND OF THE INVENTION

1. Field of the Invention

The present invention relates to regeneration of deactivated hydrocarbon processing catalysts composed of catalytic metals dispersed in a zeolite. More particularly, the present invention is directed to a method for regenerating deactivated reforming catalysts including one or more Group VIII metals in a large pore zeolite. Specifically, the present invention is a process for regenerating a catalyst comprising platinum in zeolite L. The process of this invention is particularly effective for regenerating catalysts which have been more severely deactivated than is usual, for example, due to multi-cycle of on-oil regeneration operations. In addition, catalysts regenerated in accordance with the present invention recover more of their activity and selectivity than if they were regenerated using conventional procedures. The present invention, therefore, is directed to procedures for regenerating reforming catalysts which involve (i) increasing the severity and time of the coke burn, (ii) using a source of chlorine in the oxychlorination step to redisperse platinum, (iii) improving chlorine removal by a wet, high temperature post treatment, at low pressure and (iv) enhancing reduction of platinum by using high temperature at low pressure.

2. Discussion of Background and Material Information

Catalytic reforming is a major petroleum refining process used to raise the octane rating of naphthas ($C_6$ to $C_{11}$ hydrocarbons) for gasoline blending. Catalytic reforming is also a principal source of aromatic chemicals, i.e., benzene, toluene and xylenes, via conversion of paraffins and naphthenes to aromatics.

The principal reforming chemical reactions are dehydrogenation of cyclohexane to aromatics, dehydrocyclization of paraffins to aromatics, dehydroisomerization of alkylcyclopentanes to aromatics, isomerization of normal paraffins to branched paraffins, dealkylation of alkylbenzenes, and hydrocracking of paraffins to light hydrocarbons. The hydrocracking of paraffins to light hydrocarbons is undesirable and should be minimized because light hydrocarbons have low value.

Reforming is typically carried out at temperatures of 800° F. to 1000° F., pressures of 50 psi to 3000 psi, hourly weight space velocities of 0.5 to 3.0, and in the presence of hydrogen at molar ratios to feed of 1 to 10.

Conventional production line-scale reforming plants include a plurality, e.g. three or four, adiabatic packed bed reactors containing different amounts of catalyst connected in series, commonly referred to as a reactor train. In conventional reforming processes, the naphtha feed is vaporized, mixed with hydrogen, and preheated in a furnace to a temperature within the range of about 800° F. to 1000° F. and fed into the inlet of the lead reactor. Inasmuch as reforming is a net endothermic process, the temperatures of reactor effluents are typically below or in the lower end of a reforming temperature range of 800° F. to 1000° F., thus requiring that the reactor effluent streams be reheated in furnaces installed upstream of each of the reactors.

The product stream from the last downstream reactor is cooled and flashed to low pressure in a drum and separated into a liquid reformate stream which is rich in aromatics and a gas stream which is rich in hydrogen. Part of the hydrogen-rich stream is recycled into the feed stream to provide the hydrogen to feed ratio required for the process. Hydrogen is a by-product of reforming and the net hydrogen produced is removed as a gas stream from the flash drum and purified.

Catalysts currently used in commercial reformers include a Group VIII metal, such as platinum, or platinum plus a second catalytic metal, such as rhenium or iridium, dispersed on an alumina substrate. Typically, chlorine is incorporated on the alumina to add acid functionality. Alumina-based reforming catalysts are suitable for aromatizing $C_{8+}$ paraffins, but are less effective for aromatizing $C_6$ to $C_8$ paraffins because these catalysts hydrocrack more of the lighter paraffins to low value fuel gas than they convert to aromatics.

Conventional reforming catalysts are bifunctional, i.e., the catalysts enhance i) dehydrogenation and cyclization reactions on the catalytic metal sites; and ii) isomerization on separate strong acid sites in the catalyst. The undesirable hydrocracking reactions also occur on the acid sites.

Within the past few years reforming catalysts have been developed which have been discovered to be particularly effective for aromatizing the $C_6$ to $C_8$ paraffin components of naphtha. These catalysts are made using zeolite, rather than alumina, as the support for the catalytic metal. They are mono-functional and contain relatively few strong acid sites. Unlike conventional bifunctional catalysts, zeolite based catalysts accomplish dehydrogenation and cyclization reactions as well as isomerization on the dispersed metallic catalytic sites. Because these zeolite-based catalysts have few strong acid sites, undesirable hydrocracking reactions are repressed. Zeolites which are preferred for reforming catalysts are large pore zeolites i.e. zeolites with a 6 to 15 Angstrom pore diameter. Suitable large pore zeolites for purposes of the present invention include zeolite X, Y, and L, with zeolite L being the most preferred support for reforming catalysts, particularly wherein the catalytically active metal is platinum.

Compared to conventional alumina based reforming catalysts which are acidic and bifunctional, zeolite L based catalysts are non-acidic and monofunctional. This functionality difference imparts advantages in reforming light naphtha to zeolite based reforming catalysts compared to conventional alumina based reforming catalysts.

For production line-scale reforming processes, zeolite is preferably formed into aggregates, such as extrudates or tablets, typically ⅟₃₂ to ¼ inches in size; pressure drop across zeolite powder-packed reactor beds would be unacceptably high and powder losses via elutriation in reactor off-gas would be excessive. For forming the zeolite into aggregates, oxides, such as alumina or silica, may be used as binder materials.

During reforming, catalysts deactivate due to accumulation of coke deposits in the catalyst and agglomeration of the fine catalytic metal particles dispersed in the catalyst into larger particles. Therefore, it is common practice to periodically regenerate reforming catalysts to recover their activity. Unexpectedly, however, it was found that it is more difficult to regenerate the previously described zeolite-based reforming catalysts than the conventional alumina-based catalysts.

In general, such regeneration procedures include: 1) burning off the coke deposits using oxygen, and optionally a halogen or halogen containing compound, 2) redispersing the active catalytic metals by oxyhalogenation using, for example, HCl, oxygen and water, 3) stripping excess halogen off the catalyst using first wet air, and then dry air as a stripping gas, and 4) reducing the dispersed catalytic metal using a reducing agent such as hydrogen.

For example, it is known that coke deposits may be removed from such catalysts by heating them in the presence of dilute oxygen at a flame-front temperature of 430° C. to 540° C. This combustion may be proceeded by flushing out residual hydrocarbon with inert gas, such as nitrogen. High temperature decoking however leads to loss of surface area of the supported metal particles and to removal of platinum from the zeolite channels, thereby resulting in loss of catalyst activity. Thus, after combustion, the catalyst is often subjected to oxychlorination by contact with oxygen and chlorine, or a chlorinated compound, such as $CCl_4$, at elevated temperatures.

French Patent Publication 2,360,540 filed Sep. 9, 1981 to Bernard et al. further teaches that catalyst regeneration is improved by subjecting the catalyst after oxychlorination to a treatment with water and cooling air before the catalyst is reduced. In addition, French Appl. No. 8,000,114 to Bernard discloses a hydrogen regeneration technique.

In attempts to overcome problems experienced during regeneration of large-pore, zeolite-based reforming catalysts, various procedures have been developed, for example as disclosed in U.S. Pat. Nos. 4,552,856, 4,595,668, 4,595,669, 4,595,670, 4,634,517 and 4,648,960, the disclosures of which are hereby incorporated in their entirety herein by reference thereto.

U.S. Pat. No. 4,595,668, POEPPELMEIER et al.; U.S. Pat. 4,595,669, FUNG et al.; and U.S. Pat. No. 4,595,670, TAUSTER et al., attempt to improve the reforming characteristics of zeolite-based catalysts by improving the dispersion of catalytic metals in fresh catalysts, i.e., catalysts which have not been "put on oil", and which do not contain coke products, to increase the initial activity and selectivity of the fresh catalysts relative to its performance on oil with no preemptive dispersion. These procedures, preceded by a coke burn, are also used to regenerate catalysts deactivated "on oil."

U.S. Pat. No. 3,986,982, CROWSON et al.; U.S. Pat. No. 4,493,901, BERNARD et al.; U.S. Pat. No. 4,645,751, McCULLEN et al.; U.S. Pat. No. 4,851,380, Van LEIRSBURG et al.; U.S. Pat. No. 4,855,269, MOHR and U.S. Pat. No. 4,810,683, COHN et al. are directed to regeneration of zeolite-based catalysts.

U.S. Pat. No. 3,986,982, CROWSON et al., discloses that oxidative burn-off to remove carbonaceous deposits should be performed in a manner which controls water produced from the hydrogen present in the deposits, or added, by drying the inert gas when the inert gas is recycled so as to effect a water content of the gas at the inlet which is below 200 ppm volume.

U.S. Pat. No. 4,493,901, BERNARD et al., discloses that the selectivity of regenerated zeolite-based aromatization catalysts may be improved by adding a quantity of water up to about 10% by weight with respect to the catalyst to the air used to cool the catalyst after the oxychlorination step.

U.S. Pat. No. 4,645,751, MCCULLEN et al., is directed to regeneration of deactivated noble metal containing zeolite catalysts which involves initially reducing the deactivated catalyst in hydrogen, pretreating the thus reduced catalyst with an inert gas stream containing about 0.001 to 10 weight percent hydrogen chloride, redispersing the noble metal with an inert gas stream containing about 0.001 to 10 weight percent Cl in the form of $Cl_2$ or Cl— containing organic material, and subsequently reducing the catalyst. It is disclosed that the Cl treatments may optionally occur in the presence of oxygen or sources of oxygen.

U.S. Pat. No. 4,851,380, VAN LEIRSBURG et al., is directed to a process for regenerating sulfur contaminated reforming catalysts composed of a zeolite and Group VIII metal which involves intentionally agglomerating the Group VIII metal into large agglomerates and then treating the catalyst with a halogen acid gas to remove sulfur contaminants.

U.S. Pat. No. 4,855,269, MOHR, is directed to a process for regenerating contaminated monofunctional, large-pore zeolite catalysts formed and bound using an inorganic binder which involves (a) contacting the catalyst under oxychlorinating conditions with a gas comprising 1% to 21% oxygen, 1% to 4% water, and an effective amount of chlorine atoms to achieve a chlorine to platinum ratio between 4:1 and 1000:1; (b) contacting the catalyst with a gas comprising nitrogen, for a time between 150 and 1500 GHSV, and at a temperature between 850° F. and 950° F.; and (c) contacting the catalyst with a gas comprising hydrogen having less than 1000 ppm water, at a temperature between 800° F. and 950° F. and a gas rate between 150 and 1500 GHSV.

U.S. Pat. No. 4,810,683, COHN et al., discloses that the activity of non-acidic, zeolite-based Group VIII metal catalysts which have become deactivated, in part due to the deposition of carbonaceous materials, may be restored by subjecting the deactivated catalyst to a procedure which involves a first step of contacting the deactivated catalyst with a gaseous stream comprising oxygen, a halogen, or a halogen-containing compound or a mixture thereof, and an inert component at regeneration conditions including a temperature of from 350° C.–600° C. sufficient to combust at least a portion of said carbonaceous materials for a first period of time.

This first step is followed by the second step of reducing the catalyst by contacting the catalyst with a gaseous stream comprising hydrogen at an elevated temperature for a period of time sufficient to produce a reduced/regenerated hydrocarbon conversion catalyst.

In addition to these patents, procedures are disclosed in commonly owned U.S. Pat. No. 4,925,819, FUNG et al., which issued on May 15, 1990 from U.S. patent application Ser. No. 205,567 filed Jun. 15, 1988 entitled to an effective filing date of earlier filed related U.S. Ser. No. 550,951, FUNG et al., filed Nov. 10, 1983, for improving the activity and selectivity of deactivated type L zeolite-based catalysts by dispersing the catalytic metal throughout the pores or channels of the zeolite.

U.S. Pat. No. 4,914,068 which issued on Apr. 3, 1990 from U.S. Ser. No. 170,503 filed Mar. 21, 1988, in the name of CROSS et al. entitled "Process for the Dispersion of Group VIII metal in Large Pore Zeolite Catalysts", the disclosure of which is also hereby incorporated in its entirety herein by reference thereto, discloses the advantages of a reduction step practiced at a temperature sufficiently lower than the chlorination or oxychlorination step and the benefits of cooling the catalyst in the presence of oxygen before the reduction.

U.S. Pat. No. 4,595,669, commonly owned with the present application, which issued from U.S. Ser. No. 550,902 filed on Nov. 10, 1983 in the name of Shun C. Fung and Samuel Tauster, the disclosure of which is also hereby incorporated in its entirety by reference herein thereto, is directed to a process for improving the dispersion of noble metals by an oxychlorination procedure.

In commonly owned, co-pending application U.S. Ser. No. 07/709,154 filed Jun. 3, 1991 which is a Continuation of U.S. Ser. No. 07/432,221 filed Nov. 16, 1989, FUNG et al., which is a Continuation of U.S. Ser. No. 205,567 filed Jun. 15, 1988, which issued as U.S. Pat. No. 4,925,819, there is disclosed an oxychlorination procedure which successfully regenerates reforming catalysts.

In commonly owned, co-pending application U.S. Ser. No. 07/940,579, filed Oct. 4, 1992 in the name of HUANG et al. entitled "Improved Method of Regenerating Deactivated Catalyst" (Attorney Docket No. P7716), which is a C.I.P application of U.S. Ser. No. 07/709,154, there is disclosed a regeneration procedure which is effective for regenerating a deactivated catalyst caused by formation of carbonaceous residues on the catalyst and/or agglomeration of platinum as a result of reforming for long times in an "on-oil" operation.

Platinum-on-zeolite L reforming catalysts are uniquely active and selective for aromatizing paraffinic $C_6$'s, $C_7$'s and $C_8$'s. Catalyst activity decreases progressively with time on oil due to build up of coke deposits on the catalyst and agglomeration of platinum, and although reactor inlet temperatures are periodically raised to compensate for declining activity, periodically, the catalyst must be regenerated to recover its initial activity.

Regeneration procedures disclosed in U.S. Pat. No. 4,925,819 FUNG et al. (also referred to herein as FUNG et al.) adequately recover the activity of catalysts which are normally deactivated. However, with the FUNG et al. '819 procedures, selectivity of regenerated catalysts are typically about 5% to about 10% lower than fresh catalysts. Even with diligent operation, reformers sometimes go into upset condition which severely deactivate the catalyst. Examples of upset conditions include loss of hydrogen flow or high temperature excursions due to excessive cracking reaction. Notwithstanding the disclosed effectiveness of the procedures of FUNG et al., these procedures still do not fully recover the activity of severely deactivated catalysts.

It has been discovered that the procedures in FUNG et al. '819 do not fully regenerate severely deactivated catalysts, but that with certain critical modifications as listed above, the procedure of the present invention was discovered to be useful to regenerate severely deactivated catalysts. Moreover, it was surprisingly discovered that the procedure of the present invention achieves better selectivity with normally deactivated catalysts than FUNG et al. '819. The present invention, therefore, is directed to regeneration procedures which include the previously listed modifications to FUNG et al. '819, which are critical to overcome the previously mentioned disadvantage of FUNG et al. with respect to severely deactivated catalysts.

SUMMARY OF THE INVENTION

The improved regeneration procedure of the present invention regenerates deactivated catalysts, particularly severely deactivated Pt/KL-zeolite catalysts better than the previously identified procedures, such as those disclosed in U.S. Pat. No. 4,925,819, FUNG et al., and its Continuation applications U.S. Ser. No. 07/432,221 and U.S. Ser. No. 07/709,154 filed Jun. 3, 1991, and C-I-P application U.S. Ser. No. 07/940,574, filed Oct. 4, 1992 (Atty. Docket No.: P7716).

The innovative modifications in the regeneration procedure of the present invention, over the previously identified regeneration procedures, include: (i) increased severity and time of coke burn, i.e., running the coke burn longer and at significantly more severe conditions; (ii) use of a source of chlorine capable of yielding chlorine at a partial pressure of greater than about 0.03 psia, such as elemental chlorine, i.e., $Cl_2$, HCl or other chlorine-containing agent to oxychlorinate and to redisperse Pt; (iii) improved Cl removal after oxychlorination by raising temperature, operating at low pressure, i.e., performing the postoxychlorination treatment at higher temperature to strip off more residual chlorine; and (iv) enhanced Pt reduction by raising reduction temperature to complete reduction of platinum to the zero valent state and reducing at low pressure. In addition, the decoked catalyst may be reduced with hydrogen before step (ii), in which case an inert purge step is required after the hydrogen reduction and before oxychlorination in step (ii). The improved regeneration procedure of the present invention is conducted at a pressure of about 14.7 psia to 300 psia. The concentrations of the gases used depend upon the operating pressure and are adjusted accordingly to yield a desired range of partial pressure of the gas component wherein the partial pressure of gas A=the concentration of A×the total pressure.

Although not wishing to be bound by any particular theory, we believe that the reactive gases in the oxychlorination step do not get access to all the Pt particles inside the zeolite channels in a severely deactivated catalyst. It is believed that increasing the severity of the coke burn step permits said Group VIII catalytic metal to be accessible to subsequent treatment with chlorine-containing gas because of expulsion of platinum from within the microchannels of the zeolite. This clears the microchannels of foreign matter such as coke which, if not removed, would interfere with reforming reactions. The platinum agglomerates outside the zeolite into particles which are larger than with other procedures, often exceeding 200 Å. Chlorine at high concentration is required to decompose and redisperse these larger platinum particles. With more aggressive chlorination it is necessary to enhance the post treat step and platinum reduction to ensure adequate removal of residual chlorine and complete reduction of platinum.

The present invention is directed to a process for regenerating a deactivated catalyst, that involves exposing a deactivated catalyst comprising at least one catalytic metal and zeolite contained in a vessel having an inlet and an outlet to a first gaseous stream comprising oxygen, an inert gas, and water, under oxidation conditions comprising a temperature for a time sufficient to burn coke off the deactivated catalyst and permit the Group VIII catalytic metal to be accessible to subsequent treatment with chlorine-containing gas to result in a substantially decoked catalyst; treating the substantially decoked catalyst with a second gaseous stream comprising water, chlorine from a source of chlorine, oxygen, and an inert gas under oxychlorination conditions comprising a temperature within the range of about 480° C.°550° C. for a time sufficient to chlorinate and disperse the Group VIII catalytic metal so as to result in a chlorinated catalyst comprising substantially completely dispersed Group VIII catalytic metals; removing excess chlorine from the chlorinated catalyst using a third gaseous stream comprising water, oxygen, and an inert gas at a temperature within the range of about 450° C.–530° C. at about atmospheric pressure for a time sufficient to effect a chloride partial pressure in offgas from the chlorinated catalyst of less than about 0.003 psia; and reducing the chlorinated catalyst from which excess chlorine has been removed by subjecting the chlorinated catalyst to a fourth gaseous stream comprising inert gas, hydrogen and water at a temperature within the range of about 450° C.–530° C. at about atmospheric pressure to reduce the Group VIII catalytic metal in the catalyst to the metallic state and result in a regenerated catalyst.

The process for regenerating a deactivated catalyst, as described above, also involves exposing the chlorinated catalyst to a displacement gas flow for a time sufficient to purge oxygen therefrom prior to reducing the chlorinated catalyst.

In accordance with the present invention the zeolite has channels containing particles of Group VIII metal, and the temperature and the time of the oxidation conditions are sufficient to remove a substantial amount of the particles of said group VIII catalytic metal from inside to outside the channels in the said zeolite, preferably wherein the Group VIII catalytic metal outside said channels are agglomerated particles, having a size greater than about 200 Å, and are most preferably platinum.

The process for regenerating a deactivated catalyst, described above, also involves subjecting the substantially decoked catalyst to a reducing gas stream comprising hydrogen under reducing conditions and for a time effective to reduce the substantially decoked catalyst with the second gaseous stream under oxychlorination conditions.

The processes in accordance with the present invention are described in more detail herein.

Thus, the specification and claims which follow disclose inventions intended to be claimed.

DETAILED DESCRIPTION OF PREFERRED EMBODIMENTS

The improved regeneration procedure of the present invention has four distinct steps: a) coke burn, b) oxychlorination, c) stripping, and d) hydrogen reduction.

The process for regenerating a deactivated reforming catalyst comprising zeolite and at least one Group VIII catalytic metal, in accordance with the present invention, therefore, involves the following steps:

a) coke burn step

In this stage, a deactivated catalyst contained in a vessel having an inlet and an outlet is exposed to a first gaseous stream, i.e., a coke burn gas stream, comprising oxygen, and an inert gas, and preferably an amount of water at a partial pressure up to about 1.5 psia, under oxidation conditions including a temperature of at least about 510° C. for a time sufficient to burn coke off said deactivated catalyst and make platinum present in the catalyst accessible to chlorine in the later processing step described below. Preferably, the temperature is within the range of about 520° C.–600° C., and more preferably within the range of about 530° C.–550° C., with 530° C.–540° C. being the most preferred temperature range. The coke burn step should be conducted for a time longer than about 6 hours, e.g. within the range of about 10–100 hours, more preferably 36–80 hours, with a time within the range of about 48–75 hours being more preferred and a time within the range of about 60–75 hours being most preferred. In this step, the partial pressure of water is preferably up to about 0.75 psia, and is more preferably within the range of about 0.2 psia to about 0.75 psia, and most preferably within the range of about 0.2 to about 0.5 psia.

b) oxychlorination step

In this stage, the substantially decoked catalyst is treated with a second wet gaseous stream, i.e., an oxychlorination gas stream comprising chlorine from a source of chlorine yielding chlorine at a higher partial pressure, i.e., greater than about 0.03 psia, and preferably between about 0.03 psia and 3 psia, more preferably between 0.05 psia and 1.0 psia, and most preferably between 0.1 psia and 0.5 psia, water, oxygen, and an inert gas under oxychlorination conditions comprising a temperature within the range of about 450° C. and 550° C. and for a time sufficient to chlorinate and disperse said catalytic metal to result in a chlorinated catalyst comprising substantially completely dispersed Group VIII catalytic metals. Preferably the source of chlorine is selected for the group consisting of organochloride compounds, elemental chlorine, or HCl, but is most preferably chlorine.

c) wet post oxychlorination stripping step

In this stage, excess chlorine is removed from said chlorinated catalyst using a third wet gaseous stream, i.e., a wet stripping gas stream, comprising oxygen, water, and an inert gas at a temperature within the range of about 450° C.–550° C. at about atmospheric pressure for a time sufficient to effect a chloride concentration in offgas from said chlorinated catalyst of less than about 200 vppm which corresponds to about 0.003 psia.

d) reduction step

In this stage, chlorinated catalyst from which excess chlorine has been removed is reduced by exposure to a fourth wet gaseous stream, i.e., a reduction gas stream comprising inert gas, hydrogen and water at a temperature within the range of about 450° C. to about 550° C. at about atmospheric pressure to reduce said Group VIII catalytic metal in said catalyst to the metallic state and result in a regenerated catalyst.

In addition to the foregoing, purge steps may be used between any of the previously described stages as desired or as deemed to be necessary from the standpoints of safety and technology. In this regard, a nitrogen purging step should be used before reduction to remove oxygen from the reactor to avoid forming an explosive gas mixture. Also, an optional hydrogen reduction step may be used after step a) but before step b) in which case the reduction with hydrogen should be followed with a purging of an inert gas, such as nitrogen, before step b).

The process for regenerating a deactivated catalyst may also involve, subsequent to step a), subjecting the substantially decoked catalyst to a reducing gas stream comprising hydrogen under conditions and for a time effective to reduce the substantially decoked catalyst prior to step c), wherein the reducing gas stream comprises a partial pressure of hydrogen of greater than 0.015 psia, and preferably a partial pressure of hydrogen within the range of about 0.015 psia to about 14.7 psia, more preferably within the range of about 0.15 psia to about 5 psia, and most preferably within the range of about 0.4 psia to about 1 psia. The reducing gas stream also comprises a partial pressure of water of less than about 1.5 psia, wherein the partial pressure of water preferably is less than about 0.75 psia, more preferably is within the range of about 0.2 psia to about 0.75 psia, and most preferably is within the range of about 0.2 psia to about 0.5 psia. This step of the process is performed at reducing conditions that comprise a temperature within the range of about 300° C. to about 550° C., which is preferably within the range of about 450° C. to about 530° C., and more preferably within the range of about 480° C. to about 520°

C. The reducing conditions also comprise a pressure within the range of about atmospheric pressure up to about 300 psia, preferably within the range of about 14.7 psia to about 200 psia, more preferably within the range of about 14.7 psia to about 65 psia, and most preferably wherein the pressure is about 14.7 psia.

A detailed description of the regeneration processes in accordance with the present inventions are given below.

a) Coke burn: The purpose of the coke burn step is to remove carbonaceous materials which accumulate on the catalyst during hydrocarbon processing off the catalyst by oxidizing it. The coke burn is best conducted in two phases—a primary coke burn followed by a secondary coke burn. The primary coke burn is done at less severe conditions (lower temperature and lower inlet oxygen concentration) than the secondary coke burn. This is because thermal excursions to excessively high temperatures can occur if heavily coked deactivated catalyst were exposed to severe coke burn conditions directly.

The primary coke burn is conducted suitably at a total pressure within the range of about 14.7 psia to 300 psia, preferably of about 14.7 psia to about 200 psia, and more preferably of about 50 psia to about 200 psia. As a practical matter, prior to regeneration of a deactivated catalyst, the reactors are purged to remove residual hydrocarbons left in the reactors when the hydroprocessing operation is terminated. This may be done by establishing a flow of hydrogen to the reactors and continuing hydrogen flow until hydrocarbon is displaced by hydrogen. Then flow of an inert gas such as nitrogen is established through the catalyst beds and maintained to purge the hydrogen. Linear gas velocity is maintained above about 0.5 FPS for the purges and the coke burn and for all subsequent steps in the regeneration procedure. The inert gas flowing to the inlet of the reactors during the first stage of the coke burn step a) is heated to between 400° C. and 500° C., preferably between 400° to 480° C., and more preferably between 400° to 450° C., using the feed preheater furnace. A gas stream comprising low concentrations of oxygen within the ranges of about 500 to about 6000 vppm, and preferably between about 1000 and about 4000 vppm, and an inert gas is used in the primary coke burn to avoid excessively high temperature, because of adiabatic coke burn condition. Under adiabatic coke burn, the increase in the flame front temperature depends solely on oxygen concentration regardless of the total pressure. High oxygen concentration can be used in primary coke burn when the coke burn is not carried out at the adiabatic condition, e.g. an external cooling to the reactor is available or a higher heat capacity inert gas other nitrogen is used. The primary coke burn phase, or the first stage of the coke burn step a) is continued until the molar ratio of carbon dioxide to oxygen in the reactor outlet gas falls to about 3:1. The time to complete the primary coke burn phase varies with the concentration of coke on the catalyst, space velocity, and oxygen concentration in the reactor inlet gas and can take between five and fifty hours. The first gaseous stream in this stage of the process may be substantially dry or contain an amount of water at a partial pressure of up to about 1.5 psia. Thus, the partial pressure of water in the first gaseous stream is within the range of about 0 psia to about 1.5 psia, preferably within the range of about 0 psia to about 0.75 psia, and more preferably within the range of about 0 psia to about 0.1 psia.

The secondary coke burn phase, or the second stage of the coke burn step a) is initiated by raising inlet inert gas temperature to above 510° C., raising inlet oxygen concentration to yield an oxygen partial pressure of up to about 10 psia, preferably within the range of about 0.1 psia to about 5 psia, and more preferably within the range of about 2 psia to 4 psia. Water is introduced to the reactor inlet gas stream to yield water partial pressure within the range of up to about 1.5 psia, preferably within the range of about 0 psia up to about 0.75 psia, and more preferably within the range of about 0.2 psia to about 0.75 psia, and most preferably within the rang of about 0.2 psia to about 0.5 psia. In this regard, when the first stage burn is carried out at a lower water partial pressure than the second stage coke burn, it is preferred that the catalyst be saturated with the higher water partial pressure used in the second coke burn before increasing the temperature. Preferably, the temperature is within the range of about 520° C.–600° C., and more preferably within the range of about 530° C.–550° C., with 530° C.–540° C. being the most preferred temperature range. The secondary coke burn is continued for at least 6 hours, but is not terminated until the partial pressure of carbon dioxide falls below about 0.01 psia, and preferably below about 0.004 psia. The secondary coke burn may last for up to 100 hours. The preferred time is within the range of about 36–80 hours, and is more preferably within the range of about 48–75 hours. Most preferably, the secondary coke burn is performed for a time within the range of 60–75 hours. The second stage of the coke burn step (a) is conducted suitably at a total pressure within the range of about atmospheric pressure of about 14.7 psia to about 300 psia, preferably of about 14.7 psia to about 200 psia, and more preferably of about 50 psia to about 200 psia, although the total pressures lower and higher may be used when the concentrations of gases are adjusted accordingly to yield equivalent partial pressures of the gas component wherein the partial pressure of gas A=the concentration of A×the total pressure.

In addition to removing essentially all the coke from the catalyst, a second important purpose of the coke burn step is to expel the catalytic metals in zeolite microchannels to the outside surfaces of the catalyst and as a consequence the catalytic metal is agglomerated into particles which are typically larger than about 200 Å. The substantial removal of catalytic metal from inside the zeolite channels is assured by conducting the secondary coke burn phase at a temperature above 510° C. with water present for at least 6 hours. Although not wishing to be bound by any particular theory, it is believed that the agglomeration action clears the zeolite microchannels of detritus and improves access to the catalytic metals for subsequent redispersion.

The effluent gas, i.e., the gas stream from the outlet of the vessel containing the catalyst, can be recycled during coke burn. If it is recycled then a fraction of the effluent gas must be purged and replaced with fresh inert gas to remove combustion products from the system. The purge rate is typically 5% to 30% of the recycle gas rate.

b) Oxychlorination: The purpose of the oxychlorination step is to redisperse the catalytic metals back into the zeolite microchannels by converting the metals to their chlorides. The metal chlorides are mobile and distribute facilely over the catalyst surfaces.

In the process of this invention, redispersion is accomplished by treating the decoked catalyst with a gas stream containing chlorine from a source of chlorine, oxygen, and water at a temperature between about 480° C. and 550° C., and preferably between about 500° C. to about 530° C., and more preferably at about 510° C. Preferably the source of chlorine used for purposes of the present invention comprises a source of chlorine selected from the group consisting of organochloride compounds, elemental chlorine, and HCl. Preferred organochloride compounds comprise organochloride compounds selected from the group consisting of carbon tetrachloride, chloroform, methyl chloride, methylene chloride, dichloroethane, trichloroethane, and dichloroethylene, and mixtures thereof.

Preferably the source of chlorine is from the group consisting of $Cl_2$, HCl, and $CCl_4$, and more preferably $Cl_2$ and HCl, and most preferably $Cl_2$. The oxychlorination step is conducted suitably at a total pressure at or above 14.7 psia (atmospheric pressure), and preferably within the range of about 14.7 psia to about 300 psia, and more preferably within the range of about 50 psia to about 200 psia. The concentrations of oxygen, water, and chlorine-containing compound injected at the reactor inlet are adjusted according to the reactor total pressure to yield the respective reactor inlet partial pressures, wherein the partial pressure of gas A=the concentration of gas A×the total pressure. The oxygen partial pressure at the reactor inlet is suitably within the range of about 0 psia to about 10 psia, preferably within the range of about 1 psia to about 5 psia, and more preferably within the range of about 2 psia to 4 psia. The water partial pressure at the reactor inlet is suitably within the range of about 0 psia up to about 1.5 psia, preferably within the range of about 0 psia up to about 0.75 psia, more preferably within the range of about 0.2 psia to about 0.75 psia, and most preferably within the range of about 0.2 psia to about 0.5 psia. The chlorine partial pressure at the reactor inlet is suitably greater than about 0.03 psia, preferably within the range of about 0.03 psia to about 3.0 psia, and more preferably of about 0.05 psia to 1.0 psia, and most preferably of about 0.1 psia to about 0.5 psia.

The oxychlorination is continued at least until HCl and/or chlorine appears in the reactor outlet gas stream at a partial pressure greater than about 0.02 psia which is referred to herein as the "breakthrough" of HCl and/or chlorine. After breakthrough, it is preferred to continue oxychlorination for two to four hours to make sure all the catalyst is thoroughly oxychlorinated.

c) Stripping: The purpose of stripping is to remove excess chlorine from the catalyst. Chlorine evolves during the subsequent hydrogen reduction step as HCl and induces agglomeration of the catalytic metal particles in proportion to HCl partial pressure. Accordingly, the more chlorine stripped from the catalyst prior to reduction, the higher will be the activity of the regenerated catalyst.

To improve the removal of chlorine, stripping is done at about atmospheric pressure or 14.7 psia up to about 65 psia, preferably at about 14.7 psia, with stripping gas containing water, and oxygen at a partial pressure of oxygen of less than about 4.5 psia preferably less than about 3.0 psia, and more preferably within the range of about 0.7 psia to about 3.0 psia, in an inert carrier gas stream.

The amount of water injected into the reactor inlet gas stream is adjusted according to the reactor total pressure to yield a partial pressure of water within the range of about 0 psia up to 1.5 psia, preferably within the range of about 0 psia up to about 0.75 psia, more preferably within the range of about 0 psia up to about 0.4 psia, and most preferably within the range of about 0.05 psia to about 0.4 psia, wherein the partial pressure of gas A=the concentration of gas A×the total pressure. Stripping is continued until the HCl partial pressure in the reactor offgas falls below about 0.004 psia and preferably below about 0.003 psia, but most preferably below about 0.0015 psia. This typically can take between about one and thirty hours. As previously mentioned, oxygen flow to the catalyst is terminated and the flow of wet inert gas is continued for a time to thoroughly purge oxygen from the system prior to introducing $H_2$.

To promote and enhance the efficiency of chlorine evolution, it is important that the stripping step be done at as low a pressure as practicable. In most cases this is about atmospheric pressure, i.e., 14.7 psia; however, stripping can be enhanced by pulling vacuum on the reactors. Also, it is important to maintain a temperature of at least about 450° C., preferably within the range of about 450° C. to about 530° C., more preferably of about 480° C. to about 520° C., and most preferably at about 510° C., during stripping. However, stripping may be carried out at higher reactor pressure with reduced stripping efficiency and therefore requires a longer time of stripping.

The effluent gas, i.e., the gas stream from the outlet of the vessel containing the catalyst, can be recycled. If it is recycled then a fraction of the effluent gas must be purged and replaced with fresh inert gas. The purge rate is typically 5% to 30% of the recycle gas rate.

d) Reduction: The final step is reduction of catalytic metals, e.g., platinum, now dispersed uniformly across the surfaces of the catalyst as chlorides, to small zero valent metal clusters.

This is accomplished by exposing the stripped catalyst to hydrogen at a temperature greater than about 450° C., preferably within the range of between about 450° C. and about 530° C., more preferably within the range of about 480° C. and about 520° C., and most preferably at about 510° C. Oxygen left in the stripping step is purged with inert gas, such as nitrogen, down below the explosion limit prior to introducing hydrogen. In the process of this invention, the reduction is accomplished with a gas stream containing hydrogen having a partial pressure of hydrogen greater than 0.015 psia, preferably within the range of about 0.015 psia to about 14.7 psia, more preferably of about 0.15 psia to about 5.0 psia, and most preferably of about 0.4 psia to about 1.0 psia. The gas stream at the reactor inlet for the hydrogen reduction step also contains water at a partial pressure of water of up to about 1.5 psia, preferably up to about 0.75 psia, more preferably up to about 0.4 psia, and most preferably within the range of about 0.05 psia to about 0.4 psia, in inert gas, and the reduction is conducted for a period of one to two hours. Although the exact reduction conditions used may vary, higher regenerated catalyst activity is achieved when the reduction temperature is over 450° C., preferably between about 450° C. and about 530° C., more preferably between 480° C. and 520° C., and most preferably at about 510° C., and water is present. In this regard, if is preferred that water should be present in the fourth gaseous stream in reduction step d). Hydrogen feed rate is controlled such that the partial pressure HCl in reactor offgas does not exceed about 0.0075 psia. Preferably, the reduction step d) is performed at a reactor total pressure of about 14.7 psia to about 65 psia, and preferably at about 14.7 psia. However, reactor pressure higher than 65 psia may be used in this reduction step. For an easy operation, it is preferably to operate this reduction step at the same pressure as the previous stripping step.

As previously mentioned, an optional hydrogen reduction step may be introduced after step a) and before step b).

As previously discussed, before hydrogen is introduced, however, oxygen remaining in the reactor after the coke burn must be purged from the reactor to preclude forming combustible mixtures of hydrogen and oxygen. In this stage, oxygen purging is preferably accomplished by cutting off oxygen flow and continuing nitrogen flow through the reactors.

For purposes of the present invention, feeding nitrogen for about 30 minutes to about two hours, with one hour being preferred, at a temperature of about 510° C. and a pressure within the range of between about, 14.7 psia and about 300 psia are suitable for reducing oxygen concentration to a safe level; and the nitrogen linear velocity is maintained in the catalyst beds at least about 0.5 FPS to achieve adequate gas distribution and gas/solid contacting.

Hydrogen reduction is initiated by starting flow of hydrogen into the nitrogen flowing into the reactors. Conditions of hydrogen reduction can be varied over a wide range. Hydrogen concentrations are adjusted to give a partial pressure greater than about 0.015 psia, preferably between about 0.015 psia and about 14.7 psia, more preferably between about 0.15 psia and about 5 psia, and most preferably between about 0.4 psia and about 1.0 psia. Water is also introduced into the gas stream to yield a partial pressure up to about 1.5 psia, preferably up to about 0.75 psia, more preferably between about 0.2 psia and about 0.75 psia, and most preferably between about 0.2 psia and about 0.5 psia. Pressures are within the range of about 14.7 psia to 300 psia, preferably to about 14.7 psia to about 200 psia, more preferably of about 14.7 psia to about 65 psia, and most preferably at about 14.7 psia. Temperatures are between In this hydrogen reduction step, hydrogen and inert gas may be recycled to the reactor inlet with a 10 to 30% purge. Preferably, this reduction step is carried out without recycle. In such embodiment, however, the catalyst has to be dried out after wet reduction in step (d) and before introducing hydrocarbon feed into the reactor with a drying gas comprising at least one member selected from the group consisting of nitrogen and hydrogen to a water partial pressure of less than about 0.004 psia, preferably less than about 0.003 psia, and more preferably less than about 0.0015 psia. This drying step, therefore, is accomplished by reducing the partial pressure of water in the gas stream introduced at the inlet of the vessel containing the catalyst through the introduction of the drying gas so as to result with a reduced partial pressure of water in the gas at the outlet of less than about 0.004 psia. Thus, the gas at the outlet is substantially devoid of water.

The following Table 1 tabulates the processing condition for previously described steps:

TABLE 1

RANGES OF CONDITIONS

| Regeneration Step | Components | Suitable | Preferable | More Preferable | Most Preferable |
|---|---|---|---|---|---|
| Primary Coke Burn | Oxygen | 500–6000 ppm | 1000–4000 ppm | | |
| | Water | 0–1.5 psia | 0–0.75 psia | 0–0.1 psia | |
| | Pressure | 14.7–300 psia | 14.7–200 psia | 50–200 psia | |
| | Temperature | 400–500° C. | 400–480° C. | 400–450° C. | |
| Secondary Coke Burn | Oxygen | 0–10 psia | 0.1–5 psia | 2–4 psia | |
| | Water | up to 1.5 psia | 0–0.75 psia | 0.2–0.75 psia | 0.2–0.5 psia |
| | Pressure | 14.7–300 psia | 14.7–200 psia | 50–200 psia | |
| | Time | >6 hours | 36–80 hours | 48–75 hours | 60–75 hours |
| | End Point | $CO_2$ <0.01 psia | $CO_2$ <0.004 psia | | |
| | Temperature | >510° C. | 520–600° C. | 530–550° C. | 530–540° C. |
| Oxychlorination | Oxygen | 0–10 psia | 1–5 psia | 2–4 psia | |
| | Water | up to 1.5 psia | 0–0.75 psia | 0.2–0.75 psia | 0.2–0.5 psia |
| | Chlorine | >0.03 psia | 0.03–3 psia | 0.05–1 psia | 0.1–0.5 psia |
| | Source of Cl | Chlorohydrocarbons, HCl and Cl2 | HCl, Cl2, and CCl4 | HCL and Cl2 | Cl2 |
| | Pressure | >14.7 psia | 14.7–300 psia | 50–200 psia | |
| | Temperature | 480–550° C. | 500–530° C. | about 510° C. | |
| | Breakthrough | HCl or Cl2 >0.02 psia | | | |
| Stripping | Oxygen | <4.5 psia | <3 psia | 0.7–3 psia | |
| | Water | up to 1.5 psia | 0–0.75 psia | 0–0.4 psia | 0.05–0.4 psia |
| | Pressure | 14.7–65 psia | 14.7 psia | | |
| | Temperature | >450° C. | 450–530° C. | 480–520° C. | about 510° C. |
| | End Point | HCl <0.004 psia | HCl <0.003 psia | HCl <0.0015 psia | |
| Reduction | Hydrogen | >0.015 psia | 0.015–14.7 psia | 0.15–5 psia | 0.4–1 psia |
| | Water | up to 1.5 psia | 0–0.75 psia | 0–0.4 psia | 0.05–0.4 psia |
| | Pressure | 14.7–65 psia | 14.7 psia | | |
| | Temperature | >450° C. | 450–530° C. | 480–520° C. | about 510° C. |
| | HCl release | <0.0075 psia | | | |
| Option reduction | Hydrogen | >0.015 psia | 0.015–14.7 psia | 0.15–5 psia | 0.4–1 psia |
| After coke burn | Water | up to 1.5 psia | 0–0.75 psia | 0.2–0.75 psia | 0.2–0.5 psia |
| | Pressure | 14.7–300 psia | 14.7–200 psia | 14.7–65 psia | 14.7 psia |
| | Temperature | 300–550° C. | 450–530° C. | 480–520° C. | | from about 300° C. to about 550° C., preferably from about 450° C. to about 530° C., and more preferably from about 480° C. to 520° C.

After completing hydrogen reduction, hydrogen flow is terminated and inert gas flow is continued to purge hydrogen so that oxygen required in the next step can be safely introduced. The purge can be done over a wide range of conditions; for example, passing inert gas through the catalyst at about 14.7 psia to about 300 psia and about 450° C. to about 550° C., preferably between about 450° C. to about 530° C., above about 0.5 FPS for about 30 minutes adequately clears hydrogen.

The regeneration procedure of the present invention is particularly effective for regenerating severely deactivated catalysts which are not fully regenerated using known procedures. Also, the present procedure regenerates normally deactivated catalyst to higher activity and selectivity than known procedures.

The effluent gas, i.e., the gas stream from the outlet of the vessel containing the catalyst, can be recycled. If it is recycled then a fraction of the effluent gas must be purged and replaced with fresh inert gas. The purge rate is typically 5% to 30% of the recycle gas rate.

For purposes of the present invention, preferred catalysts are monofunctional catalysts based on large pore zeolite crystals bound together by a binder which is preferably selected from the group consisting of kaolin, and silica, and is most preferably alumina. The large pore zeolite is preferably zeolite L and more preferably is a zeolite L including exchangeable cations at least a portion of which are selected from the group of exchangeable cations consisting of lithium, sodium, potassium, rubidium, cesium, magnesium, calcium, strontium, and barium, and mixtures of lithium, sodium, potassium, rubidium, cesium, magnesium, calcium, strontium, and barium, more preferably, wherein the group of exchangeable cations consists of potassium, and barium, and most preferably are potassium cations.

The Group VIII catalytic metals are preferably Group VIII noble metals which are preferably selected from the group consisting of platinum, palladium, rhodium, iridium, ruthenium and osmium, and most preferably platinum. The amount of the Group VIII catalytic metal present is preferably within the range of about 0.05% to about 6%.

The catalytic metal may further comprise a Group VII B metal, such as rhenium which is a preferred Group VII B metal. As used herein, the metals have been identified and are grouped in accordance with the Period Table in the *Handbook of Chemistry & Physics*, published by the Chemical Rubber Company, 48th edition.

The base of the catalyst is approximately 70% zeolite L and 30% alumina by weight and is formed into 1/16 inch extrudates. For purposes of the present invention, however, binders other than alumina, such as silica, kaolin and clay may be used; and formed shapes, other than extrudates, such as spheres, tablets, pellets and extrudates may also be used. The formed catalyst is then loaded with platinum by ion exchange so that the metal loading is between 0.6% and 0.9% by weight. Representative patents disclosing details of catalyst preparation, characterization, and manufacture suitable for purposes of the present invention include U.S. Pat. No. 3,216,789 which describes zeolite L; U.S. Pat. Nos. 4,104,320; 4,416,806; and, 4,568,656 which describe processes of ion exchange of platinum into zeolite L; U.S. Pat. Nos. 4,595,668; 4,595,669; and 4,595,670 which describe preferred reforming catalysts comprising platinum on zeolite L which has finely dispersed platinum; and U.S. patent application Ser. No. 07/414,285 filed Sep. 29, 1989 which defines the process for forming zeolite L into extrudates using alumina as the binder; the disclosures of the previously identified patents and patent applications are hereby incorporated in their entireties by reference thereto herein.

The activity of a catalyst is a measure of its ability to convert feed to products. While a catalyst may have a high activity, the products formed may not be necessarily the desired products. The term "selectivity" is a measure of the ability of the catalyst to convert feed to desired products. Activity maintenance concerns the ability of the catalyst to maintain activity over time at conversion conditions.

The decline in catalyst activity at conversion conditions is believed to be due primarily to crystal growth or agglomeration of the noble metal particles to about the size of the zeolite channels about 12 Å and secondarily to the formation of coke on the external and internal surfaces of the catalyst. At the same noble metal loading, catalysts containing particles or crystals of noble metals of a size greater than that disclosed above are less active and less selective than catalysts containing the smaller particles. Moreover, agglomerated metal particles block zeolite channels. Coke formation, probably due to complex condensation and dehydrogenation reactions, results in the shielding of the noble metal from the reaction mixture, thereby limiting the catalytic sites available for promoting reactions.

As catalytic activity declines by virtue of agglomeration and coke formation, yield of desirable products will decline, and depending upon the economics of the operation a process employing the catalyst will have to be interrupted and catalyst activity restored to its initial value. Generally, catalytic activity can be maintained by increasing temperature, but there are limits beyond which the temperature cannot be increased, for example, temperatures which will change the nature of the zeolite or lead to undesirable side reactions or exceed reactor material limitations. Particularly for zeolite based catalysts, temperatures higher than about 1000° F. to about 1100° F. are to be avoided.

Catalyst activity will decline faster over time as severity increases. Factors which increase severity include: increasing temperature, reducing hydrogen to oil mole ratio, reducing hydrogen partial pressure, reducing total pressure and temperature, increasing feed rate per volume or catalyst (space velocity), and increasing type of hydrocarbon in the feed.

In the measurement of activity maintenance all variables are fixed and only the catalyst differs. Thus, an activity of one catalyst over a period of time can be directly compared to the activity of another catalyst over the same time period where feed, hydrogen to oil ratios, pressures, etc., are constant.

One activity test utilized for purposes of the present application is to pass a feedstream comprising about 40 wt. % normal hexane and 60% isohexanes over the catalyst at the following conditions: 510° C., 1.0 WHSV, 121.7 psia, 4.25 $H_2$/oil molar ratio. Benzene yield as a percent of feed after 46 hours is a good measure of catalyst activity.

Although the regeneration process herein may apply to deactivated catalysts at any stage of deactivation, it is particularly suitable for those which are severely deactivated.

EXAMPLES

The following non-limiting examples are presented to further illustrate the present invention and are not meant to limit the invention to the specific treatment parameters which are described. These examples illustrate the efficacy of the invention. In all examples, parts and percentages are given by weight for solids and liquids and by volume for gas compositions, and temperatures in degrees Centigrade unless otherwise noted.

Example 1

A 0.64 wt % Pt on KL-zeolite extruded catalyst was used to aromatize a light naphtha feed. The flow of hydrogen to the reactor was cut off and the catalyst was exposed to pure hydrocarbon feed for about 5 hours at reforming conditions. The catalyst was thus deactivated, i.e., coked up severely, as indicated by accumulation of about 15 wt. % by weight of coke in contrast to a normally deactivated catalyst which typically contains about 1 wt. % coke.

Two grams of the severely deactivated catalyst were regenerated by the following standard HCl+$O_2$ redispersion procedure:

First coke deposit was removed by burning at 450° C. with 20 vol. % $O_2$ in helium at 500 cc/min. for 30 minutes; then temperature was increased to 510° C. and water at 2.2 vol. % was added, and the catalyst was subjected to these conditions for 2 hours. Next HCl was added to the gas stream to give 0.16 vol. % and at the same time oxygen concentration was reduced to 10 vol. %. The total gas flow rate was maintained at 500 cc/min. The oxychlorination treatment was performed for 2.5 hours. After the previously described oxychlorination procedure, the catalyst was treated with 2.2 vol. % water, 10 vol. % $O_2$ and 87.8 vol. % helium for 1 hour. Oxygen was purged out in about 10 minutes with wet helium containing about 2% water vol. %. Hydrogen reduction was conducted at 510° C. with 10 vol. % $H_2$, and 2.2 vol. % $H_2O$ and 87.8 vol. % helium at a flow rate of 500 cc/min. for 1.5 hours. The regenerated catalyst was designated as Catalyst A.

Example 2

The coked catalyst used in Example 1 was regenerated with the regeneration procedure as described in Example 1 except that during the second stage of the coke burn procedure, the temperature was increased to about 530° C. which was thereafter employed and the treat time was extended to about 6 hours; also during oxychlorination, 0.82 vol. % $Cl_2$ instead of HCl was employed. The regenerated catalyst regenerated in accordance with the present invention was designated as Catalyst B.

Example 3

The above two catalysts were evaluated using 3-methylpentane feed. The reaction was carried out at 510° C. at a space velocity of 20 w/w/hr, $H_2$/oil-6, and 105 psia. Table 2 shows the catalyst performance of Catalyst A and B. Catalyst B which was regenerated by a process in accordance with the present invention shows a higher benzene yield and selectivity than Catalyst A.

TABLE 2

| Catalyst | Wt % Benzene @ 10 Hr | Wt % Benzene @ 25 Hr | Selectivity @ 25 Hr |
|---|---|---|---|
| A | 24.5 | 20.2 | 67.3 |
| B | 26.3 | 22.6 | 68.8 |

Example 4

A 0.85 wt % Pt on KL-zeolite catalyst was deactivated during aromatization of a light naphtha feed. One gram of this catalyst was regenerated with the procedure of Example 1, except that after the second coke burn, the catalyst was reduced at 510° C. with 20 vol. % $H_2$ and 2.2 vol. % water for 1 hour before an HCl+$O_2$ oxychlorination and the HCl concentration was 0.32 vol. %. The regenerated catalyst was designated as Catalyst C.

Example 5

The coked catalyst used in Example 4 was regenerated with the same procedure as Example 2 except that in the second coke burn, the burn time was increased to 22 hours and there was a wet hydrogen reduction before the $Cl_2+O_2$ oxychlorination. The regenerated catalyst was designated as Catalyst D.

Example 6

The above two catalysts were evaluated using 3-methylpentane feed. The reaction was carried out at 510° C. at a space velocity of 20 w/w/hr, $H_2$/oil-6, and 105 psia. Table 3 shows the catalyst performance of Catalyst C and D.

Catalyst D which was regenerated by the instant invention shows better catalyst performance than Catalyst C.

TABLE 3

| Catalyst | Wt % Benzene @ 10 Hr | Wt % Benzene @ 25 Hr | Selectivity @ 25 Hr |
|---|---|---|---|
| C | 22.2 | 18.3 | 69.6 |
| D | 25.2 | 20.8 | 69.8 |

Example 7

A catalyst was deactivated through 6 cycles of on-oil and regeneration operations in the Catalyst Treating Unit. One gram of this catalyst was regenerated using exactly the same procedure as Example 1. The regenerated catalyst was designated as Catalyst E.

Example 8

The deactivated catalyst used in Example 7 was employed in this example. Four grams of this catalyst was regenerated using exactly the same procedure as Example 2 except that the time of the coke burn step was extended to 69 hours. The regenerated catalyst was designated as Catalyst F.

Example 9

The above two catalyst were evaluated using 3-methylpentane feed. The reaction was carried out at 510° C. at a space velocity of 20 w/w/hr, $H_2$/oil-6, and 105 psia. Table 4 shows the catalyst performance of Catalyst E and F. Catalyst F which was regenerated by the instant invention shows a better catalyst performance than Catalyst E.

TABLE 4

| Catalyst | Wt % Benzene @ 10 Hr | Wt % Benzene @ 25 Hr | Selectivity @ 25 Hr |
|---|---|---|---|
| E | 19.6 | 16.0 | 67.6 |
| F | 21.5 | 18.8 | 64.6 |

Advantages of the present invention in the regeneration of Pt on KL-zeolite include the externalization of the Pt particles to the outside surface of the zeolite crystallites during high temperature coke burn which appears to open up the zeolite channels for Pt redistribution in the oxychlorination step. The redispersion of large Pt particles which are larger than about 200 Å requires high concentration of chlorine to facilitate the formation of mobile Pt chloride species. Although not wishing to be bound by any particular theory, it is believed that this redistribution of external Pt into zeolite channels may promote highly dispersed Pt clusters which reside near the channel mouths thereby yielding better catalyst performance.

The following examples using fresh catalysts give some support to the above interpretation.

Example 10

A sample of about 3 grams of a 0.85 wt % Pt/KL-zeolite catalyst was subjected to a 510° C. calcination of 20 vol. % $O_2$, 2.2 vol. % $H_2O$ and 77.8 vol. % helium at a flow rate of 500 cc/min. for 2 hours. Less than 10% of the Pt formed particles had a size greater than about 200 Å. Substantial amount of Pt remained inside the zeolite channels as large and small particles. This catalyst was designated at Catalyst G.

Example 11

Ten grams of the fresh catalyst used in Example 11 were calcined at 530° C. in 20 vol. % $O_2$, 2.2 vol. % $H_2O$, and 77.8 vol. % helium at a flow rate of 500 cc/min. for 64 hours. Substantially all the Pt was removed from the zeolite channels to the external surface of the zeolite crystallites as particles larger than about 200 Å. This catalyst was designated as Catalyst H.

Example 12

Two grams each of Catalysts G and H were regenerated using the same oxychlorination procedure as that in Example 1 except that higher HCl concentration (0.58 vol. %) was used. The regenerated catalysts were designated as Catalysts I and J, respectively.

Example 13

Two grams each of Catalyst G and H were regenerated using the same procedure as in Example 12 except that HCl concentration was increased to 1.08 vol. %. The regenerated catalysts were designated as Catalysts K and L respectively. Catalysts I, J, K, and L were evaluated by 3-methylpentane aromatization and hydrogen chemisorption. The results are in Table 5. Higher concentrations of HCl produces higher $Cl_2$ concentration via the Deacon reaction:

$$4 HCl + O_2 \rightleftharpoons 2 Cl_2 + H_2O.$$

TABLE 5

| Catalyst | H/Pt | Wt % Benzene @ 25 Hr | Benzene Selectivity |
|---|---|---|---|
| Fresh | 0.78 | 19.4 | 68.2 |
| I | 0.59 | 22.2 | 67.6 |
| J | 0.37 | 18.6 | 68.7 |
| K | 0.71 | 22.9 | 69.3 |
| L | 0.59 | 21.2 | 68.5 |

Table 4 indicates that higher HCl concentration in the HCl+$O_2$ oxychlorination improve platinum dispersion for the 510° C. calcined catalysts (Catalysts I and K from (0.59 to 0.71) and 530° C. calcined catalysts (Catalysts J and L from 0.37 to 0.59). Catalyst performance is also affected, especially in the case of catalysts J and L.

Example 14

Two grams each of Catalysts G and H were regenerated using the same oxychlorination procedure as that in Example 2 in which oxychlorination was carried out with 0.82 vol. % $Cl_2$. The regenerated catalysts were designated as Catalysts M and N respectively. Catalysts M and N were evaluated by 3-methylpentane aromatization and hydrogen chemisorption. The results are in Table 6.

TABLE 6

| Catalyst | H/Pt | Wt % Benzene @ 25 Hr | Benzene Selectivity |
|---|---|---|---|
| Fresh | 0.78 | 19.4 | 68.2 |
| M | 0.73 | 21 | 69.8 |
| N | 0.74 | 25.4 | 70.2 |

Table 5 indicates that high $Cl_2$ concentration completely redisperses the particles of Pt which are 200 Å formed during the 530° C. calcination. Additionally, the 530° C. calcined catalyst (N) showed a much higher activity than the fresh and the 510° C. calcined catalyst (M) after $Cl_2+O_2$ oxychlorination. Although not wishing to be bound by any particular theory, this suggests that redispersion of the large Pt particles on the external surface of the zeolite crystallites (530° C. calcined catalyst (N)) leads to highly dispersed Pt clusters in the zeolite channels but close to the channel mouths compares to the case of redispersing agglomerated Pt particles inside zeolite channels (510° C. calcined catalyst (M)).

Example 15

A 0.84 wt % Pt on KL-zeolite extruded catalyst was used to aromatize a light naphtha feed. The catalyst was severely deactivated and heavily coked. The color of the catalyst was black. Three grams of the catalyst were regenerated by the following HCl+$O_2$ redispersion procedure. First coke deposit was removed by burning at 450° C. with 10 vol. % $O_2$ in helium at 1000 cc/min. for 1 hour. Then temperature was increased to 510° C. and held at 510° C. for 12 hours. Next water and HCl were added to the gas stream to give 3.3 vol. % and 0.33 vol. %, respectively, and at the same time oxygen concentration was still maintained at 10 vol. %. The total gas flow rate was maintained at 1000 cc/min. The oxychlorination treatment was for 6 hours. The catalyst was then cooled to 345° C. under substantially same gas environment and was treated with 3.3 vol. % water, 10 vol. % $O_2$ and 87.8 vol. % nitrogen for 1 hour. Oxygen was purged out in about 10 minutes with nitrogen. Hydrogen reduction was conducted at 345° C. with 10 vol. % $H_2$ and 90 vol. % helium at a flow rate of 1000 cc/min for 1 hours. The regenerated catalyst was designated as Catalyst O.

Example 16

The coked catalyst used in Example 15 was regenerated with the regeneration procedure in accordance with the present invention. The coke was first removed by burning at 445° C. with 10 vol. % oxygen in nitrogen for 1 hour. The temperature was raised to 530° C. under 20% $O_2$, 2.2% $H_2$ and balanced helium. The catalyst temperature was held at 530° C. for 69 hours before it was cooled to 510° C. During oxychlorination, catalyst was treated with a gas mixture of 2.2% $H_2O$, 20% $O_2$, 1.5% $Cl_2$, and balanced He for 2.5 hours at 510° C. After the oxychlorination the catalyst was treated with 2.2 vol. % water, 10 vol. % $O_2$, and 87.8 vol. % helium at 510° C. for 1 hour. Oxygen was purged in about 10 minutes with wet helium. Hydrogen reduction was conducted at 510° C. with 20% $H_2$, 2.2 vol. % water and 87.8 vol. % helium at a flow rate of 500 cc/min. for 1.5 hours. The regenerated catalyst was designated Catalyst P.

Example 17

Catalysts O and P and fresh catalyst were evaluated by an aromatization reaction with a mixed feed of 60 wt % 3-methyl pentane and 40 wt % n-hexane. The reaction was carried out at 510° C. at a space velocity of 8 w/w/hr, $H_2$/oil-2.5, and 107 psia. Table 7 shows the catalyst performance of fresh catalyst and Catalysts O and P. Catalyst P which was regenerated by the current invention shows a better catalyst performance than Catalyst O and fresh catalyst.

21

TABLE 7

| Catalyst | Wt % Benzene @ 46 Hr | Bz Selectivity @ 46 Hr |
|---|---|---|
| Fresh | 37 | 76 |
| O | 33 | 65 |
| P | 40 | 75 |

Example 18

A 0.85 wt % Pt on KL-zeolite catalyst was used to aromatize a light naphtha feed. The catalyst was normally deactivated in that it contained about 1–2% coke. The coke level was regenerated by a conventional procedure as described in Example 15. This catalyst is designated as Catalyst Q.

In parallel, three grams of the catalyst were regenerated by a regeneration procedure in accordance with the present invention as disclosed in Example 16. This catalyst is designated as Catalyst R. Catalysts Q and R were evaluated under an aromatization test condition described in Example 17. Table 8 indicates that the regeneration procedure in accordance with the present invention achieves higher activity and selectivity than a conventional procedure used to regenerate a normally deactivated catalyst.

TABLE 8

| Catalyst | Wt % Benzene @ 46 Hr | Bn Selectivity @ 46 Hr |
|---|---|---|
| Q | 37 | 72 |
| R | 40 | 75 |

Example 19

A 0.85 % wt. % Pt on formed KL-zeolite catalyst was used to aromatize a light naphtha feed. The catalyst was normally deactivated, i.e., the catalyst contained about 1–2% coke. The catalyst was regenerated using the following procedure:

The coke was removed by coke burn at 450° C. for 10 hours with 0.2 vol. % oxygen in nitrogen under 185 psia total pressure and 0.5 FPS linear velocity. The coke burn was further carried out at 510° C. for 16 hours with 3.5 vol. % oxygen. After oxygen was purged out, the catalyst was reduced at 510° C. with 50% hydrogen for 1 hour. After hydrogen was purged out, the catalyst was then preconditioned for oxychlorination with 0.89 vol. % oxygen and 0.87 vol. % water vapor at 510° C. under 170 psia total pressure. HCl was added to the stream to a concentration of 0.15 vol. % for 4.5 hours. The catalyst was cooled to 345° C. under same gas environment. The catalyst was then treated with 5 vol. % oxygen and 0.84% vol. % water vapor at 345° C. under atmospheric pressure for 8 hours. Water vapor was removed from the stream, and the catalyst was further treated at 345° C. for 2 hours. After oxygen was purged out from the system, the catalyst was reduced at 345° C. with 7 vol. % hydrogen for 6 hours. The catalyst is designated as Catalyst S.

A batch of the similar normally deactivated 0.85% Pt/KL-zeolite catalyst was regenerated by a regeneration procedure in accordance with the present invention. The coke was removed by coke burn at 450° C. for 10 hours with 0.2 vol. % oxygen under 185 psia total pressure and 0.5 FPS velocity. The coke burn was further carried out at 530° C. for 69 hours with 1.6 vol. % oxygen and 0.2 vol. % water vapor. The catalyst was oxychlorinated with 1.7 vol. % oxygen, 0.12% vol. % $Cl_2$, and 0.2 vol. % $H_2O$ at 510° C. for 2.5 hours under 185 psia total pressure. The catalyst was then treated with 10.5 vol. % oxygen and 2.2 vol. % water vapor at 510° C. under atmospheric pressure for 10 hours. After oxygen was purged out from the system, the catalyst was reduced at 510° C. with 5.8 vol. % hydrogen and 2.2 vol. % water vapor for 1.5 hours at atmospheric pressure. The catalyst is designated as Catalyst T.

The activities of Catalysts S and T in light naphtha aromatization under the following conditions:

| Feedstream | Conditions |
|---|---|
| Mixed $C_6$s | 1.8 WHSV |
| 60% $nC_6$ | 2 $H_2$/Oil Molar Ratio |
| 40% $iC_6$ | 105 psia |
| | 505° C. |

The normally deactivated catalyst regenerated in accordance with the present invention has higher activity and selectivity than the catalyst regenerated by the HCl procedure.

TABLE 9

| Catalyst | Wt % Benzene @ 100 Hr | Bn Selectivity @ 100 Hr |
|---|---|---|
| S | 43 | 66 |
| T | 48 | 68 |

The catalysts regenerated by the process of this invention may be employed as reforming catalysts using reforming conditions which are well known in the art.

In summary, the present invention is seen to provide a method which is particularly effective for regenerating severely deactivated reforming catalysts, preferably extrudates of potassium-exchanged zeolite L containing platinum, so as to substantially restore catalyst activity and activity maintenance to the catalyst. The regeneration procedure of the present invention, however, is also useful for regenerating normal deactivated reforming catalysts.

Although the invention as described with reference to particular means, materials and embodiments, from the foregoing description, one skilled in the art can easily ascertain the essential characteristics of the present invention; and various changes and modifications may be made to various usages and conditions, without departing from the spirit and scope of the invention as described in the claims that follow.

What is claimed is:

1. A process for regenerating a deactivated monofunctional, non-acidic reforming catalyst comprising a Group VIII catalytic metal and zeolite L, said process comprising:

(a) contacting the deactivated catalyst with a gaseous stream comprising oxygen, inert gas and water under oxidation conditions comprising a temperature of from 400° C. to 600° C. for a time sufficient to burn coke off the deactivated catalyst and convert the metal to agglomerated particles which are accessible to chlorine-containing gas in subsequent process step (b) and a substantial portion of said agglomerated particles are located outside the channels of said zeolite L and have particle size greater than 200 Angstrom;

(b) contacting the substantially decoked catalyst with a gaseous stream comprising water, a source of chlorine, oxygen, and an inert gas under oxychlorination conditions comprising a temperature of from 450° C. to 550° C. and a partial pressure of chlorine derived from the source of chlorine which is greater than 0.03 psia for a time sufficient for at least one member selected from the group consisting of hydrogen chloride and chlorine to breakthrough the catalyst to an $HCl+Cl_2$ partial pressure greater than 0.02 psia so as to chlorinate and disperse the metal and result in a chlorinated catalyst comprising substantially completely dispersed chlorinated catalytic metal;

(c) contacting the chlorinated catalyst with a gaseous stream comprising water, oxygen, and an inert gas under chlorine removal conditions comprising a temperature of from 450° C. to 550° C., a low total pressure of less than 300 psia, and a time effective to remove excess chlorine from the chlorinated catalyst and result in a gaseous stream after contact with the catalyst comprising hydrogen chloride at a partial pressure of less than 0.004 psia; and (d) contacting the chlorinated catalyst from step (c) with a gaseous stream comprising inert gas and hydrogen under reducing conditions comprising a low total pressure of less than 300 psia and a temperature of from 350° C. to 550° C. for a time effective to reduce at least some of the catalytic metal in the catalyst to the metallic state and result in a regenerated catalyst comprising dispersed catalytic metal and zeolite.

2. A process according to claim 1 wherein step (a) is performed under at least one condition selected from the group consisting of a temperature of from 520° C. to 600° C., an oxygen partial pressure not greater than 69 kPaa (10 psia), a water partial pressure not greater than 10.3 kPaa (1.5 psia), a total pressure of from sub-atmospheric to 2.07 MPaa (300 psia), and for a time of from 48 to 75 hours.

3. A process according to claim 1 wherein step (a) is performed for a period of time until the gaseous stream after contact with the catalyst comprises a partial pressure of carbon dioxide of less than 69 Paa (0.01 psia).

4. A process according to claim 1 in which step (a) is performed in two stages wherein the first stage is carried out at a temperature higher than that in the second stage.

5. A process according to claim 4 wherein the first stage is performed at a temperature of from 400° C. to 500° C. and the second stage is performed at a temperature of from 520° C. to 600° C.

6. A process according to claim 1 wherein step (b) is performed under at least one condition selected from the group consisting of a temperature of from 480° C. to 550° C., an oxygen partial pressure not greater than 69 kPaa (10 psia) and at a water partial pressure not greater than 10.3 kPaa (1.5 psia), a total pressure of from sub-atmospheric to 2.07 MPaa (300 psia), and for at least 2 hours after breakthrough of at least one member selected from the group consisting of HCl and $Cl_2$.

7. A process according to claim 6 wherein step (b) is performed under at least one condition selected from the group consisting of an oxygen partial pressure of from 13.8 to 27.6 kPaa (2 to 4 psia), a water partial pressure of from 1.36 to 5.17 kPaa (0.2 to 0.75 psia), and a total pressure of from 345 kPaa to 1.38 MPaa (50 to 200 psia).

8. A process according to claim 1 wherein step (b) is performed at a chlorine partial pressure of from 207 Paa to 20.7 kPaa (0.03 to 3 psia).

9. A process according to claim 1 wherein step (c) is performed under at least one condition selected from the group consisting of a temperature of from 480° C. to 520° C., a water partial pressure not greater than 10.3 kPaa (1.5 psia), and an oxygen partial pressure of less than 30 kPaa (4.5 psia).

10. A process according to claim 9 wherein step (c) is performed under at least one condition selected from the group consisting of a water partial pressure of from 345 Paa to 2.76 kPaa (0.05–0.4 psia), and an oxygen partial pressure of from 4.82 Paa to 20.7 kPaa (0.7 to 3 psia).

11. A process according to claim 1 wherein step (c) is performed at a total pressure of from sub-atmospheric to 448 kPaa (65 psia).

12. A process according to claim 1 wherein step (c) is performed for a period of time until the gaseous stream after contact with the catalyst comprises a partial pressure of hydrogen chloride of less than 10.3 Paa (0.0015 psia).

13. A process according to claim 1 wherein step (d) is performed under at least one condition selected from the group consisting of a hydrogen partial pressure greater than 103 Paa (0.015 psia), and a temperature of from 480° to 520° C. and in the presence of water.

14. A process according to claim 13 wherein step (d) is performed under at least one condition selected from the group consisting of a hydrogen partial pressure of from 1.03 kPaa to 34.5 kPaa (0.15 to 5 psia), and a water partial pressure of from 345 Paa to 2.76 kPaa (0.05 to 0.4 psia).

15. A process according to claim 1 wherein step (d) is performed at a total pressure of from sub-atmospheric to 448 kPaa (65 psia).

16. A process according to claim 1 wherein step (d) is performed under conditions such that the gaseous stream after contact with the catalyst comprises hydrogen chloride at a partial pressure of less than 51.7 Paa (0.0075 psia).

17. A process according to claim 1 wherein between steps (a) and (b) there is performed an intermediate reducing step comprising contacting the substantially decoked catalyst with a gaseous stream comprising inert gas and hydrogen under reducing conditions for a time effective to reduce the metal component of the catalyst to the metallic state.

18. A process according to claim 1 wherein between steps (c) and (d) there is performed a purging step comprising contacting the chlorinated catalyst from step (c) with an oxygen-free displacement gas flow for a time sufficient to purge oxygen therefrom prior to performing step (d).

19. A process according to claim 1 wherein said zeolite L comprises an exchangeable cation selected from the group consisting of potassium and barium and a Group VIII catalytic metal comprising platinum present as from 0.05 to 6 wt % of the catalyst, and a binder.

20. A process according to claim 1 wherein the regenerated catalyst produced in step (d) has an activity for aromatizing hexanes to benzene in accordance with the test defined in Example 3 hereof, measured in weight percent yield of benzene, which is at least 1.5 wt % greater than the activity of the low activity catalyst before regeneration.

21. A process according to claim 3 wherein the partial pressure of carbon dioxide is less than 27.6 Paa (0.004 psia).

* * * * *

UNITED STATES PATENT AND TRADEMARK OFFICE
CERTIFICATE OF CORRECTION

PATENT NO. : 5,776,849
DATED : July 7, 1998
INVENTOR(S) : Shun Chong Fung, Bridgewater, N.J.; Yao-Jyh Robert Huang, John Francis Walsh, both of Houston, TX; Gary Brice McVicker, Califon. N.J.; Kenneth Ray Clem, Humble, TX It is certified that error appears in the above-identified patent and that said Letters Patent is hereby corrected as shown below:

On the title page, item

[*] Notice, line 3, --5,925,819-- should read "4,925,819".

Signed and Sealed this

Twenty-fifth Day of May, 1999

Attest:

Q. TODD DICKINSON

*Attesting Officer*      *Acting Commissioner of Patents and Trademarks*